United States Patent
Choi et al.

(10) Patent No.: US 7,365,797 B2
(45) Date of Patent: Apr. 29, 2008

(54) DISPLAY SYNCHRONIZATION SIGNAL GENERATION APPARATUS IN DIGITAL BROADCAST RECEIVER AND DECODER

(75) Inventors: Young-hun Choi, Yongin-si (KR); Byeong-jin Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 474 days.

(21) Appl. No.: 10/944,934

(22) Filed: Sep. 21, 2004

(65) Prior Publication Data

US 2005/0063474 A1  Mar. 24, 2005

(30) Foreign Application Priority Data

Sep. 22, 2003 (KR) .................. 10-2003-0065532

(51) Int. Cl.
 *H04N 5/04* (2006.01)
(52) U.S. Cl. ..................................... 348/537
(58) Field of Classification Search ............. 348/537, 348/538, 540, 505, 516, 521, 524, 547
See application file for complete search history.

(56) References Cited

U.S. PATENT DOCUMENTS

| 5,710,573 | A | * | 1/1998 | Hung et al. ............ 345/634 |
| 5,943,382 | A | * | 8/1999 | Li et al. ............... 375/376 |
| 6,310,922 | B1 | * | 10/2001 | Canfield et al. ....... 375/240.28 |
| 6,316,974 | B1 | | 11/2001 | Taraci et al. |
| 6,441,658 | B1 | * | 8/2002 | Taraci et al. ............ 327/147 |
| 6,943,844 | B2 | * | 9/2005 | Cahill, III ............. 348/537 |
| 7,071,996 | B2 | * | 7/2006 | Naegle ................. 348/500 |
| 2001/0055469 | A1 | | 12/2001 | Shida et al. |
| 2003/0025785 | A1 | * | 2/2003 | Nihei et al. ............ 347/250 |

FOREIGN PATENT DOCUMENTS

| CN | 1137207 A | 12/1996 |
| JP | 11-112982 A | 4/1999 |
| JP | 11-177653 A | 7/1999 |
| JP | 2001-257664 A | 9/2001 |
| JP | 2002-15527 A | 1/2002 |
| KR | 1998-047907 A | 9/1998 |

(Continued)

*Primary Examiner*—Paulos M. Natnael
(74) *Attorney, Agent, or Firm*—Sughrue Mion, PLLC

(57) ABSTRACT

A display synchronization signal generation apparatus and method is provided which makes it possible to display a stable image irrespective of changes in transmission speed of a received digital broadcast signal by generating a synchronization signal of an image to be displayed independently of a decoding period. A decoder suitable for the display synchronization signal generation apparatus is also provided. The decoder includes a clock signal generation unit, a pixel clock signal generation unit, and a synchronization signal generation unit. The clock signal generation unit generates a plurality of clock signals used for the decoding of the decoder based on a reference clock signal whose speed is controlled according to the transmission speed of a received broadcast signal. The pixel clock signal generation unit generates a display pixel clock signal based on a basic clock signal that is not dependent on the reference clock signal. The synchronization signal generation unit generates a horizontal synchronization signal and a vertical synchronization signal of the image to be displayed, in synchronization with the pixel clock signal generated by the pixel clock signal generation unit.

20 Claims, 3 Drawing Sheets

FOREIGN PATENT DOCUMENTS

| | | |
|---|---|---|
| KR | 0161400 B1 | 1/1999 |
| KR | 1999-0063287 A | 7/1999 |
| KR | 20-0165753 Y1 | 1/2000 |
| KR | 2000-0041905 A | 7/2000 |
| KR | 2001-0081321 A | 8/2001 |
| WO | WO 03/043341 A1 | 5/2003 |

* cited by examiner

DISPLAY SYNCHRONIZATION SIGNAL GENERATION APPARATUS IN DIGITAL BROADCAST RECEIVER AND DECODER

CROSS REFERENCE TO RELATED APPLICATION

This application claims the priority of Korean Patent Application. No. 2003-65532, filed on Sep. 22, 2003, in the Korean Intellectual Property Office, the disclosure of which is hereby incorporated by reference in its entirety.

BACKGROUND OF THE INVENTION

1. Field of the Invention

The present invention generally relates to a display synchronization signal generation in a digital broadcast receiver, and more particularly, to a display synchronization signal generation apparatus and method, which make it possible to display a stable image irrespective of changes in transmission speed of a received broadcast signal, and a decoder suitable for the synchronization signal generation apparatus.

2. Description of the Related Art

A purpose of digital broadcasting is to provide users with video and audio of higher quality than analog broadcasting system and to support bi-directional communication. Such digital broadcasting is transferred to a digital broadcast receiver via a ground wave, satellite, or cable in the form of a motion picture experts group (MPEG)-transport stream (TS).

MPEG-TS data includes video and audio information of a plurality of programs along with additional information required for broadcasting. Once the digital broadcast receiver receives the MPEG-TS, it selects a channel and a program by carrying out MPEG decoding, divides audio and video signals from the selected program, and outputs the divided audio and video signals. At this time, a transmission speed of the MPEG-TS and a frequency of a system clock signal used in MPEG decoding are linked to each other.

Thus, when the transmission speed of the MPEG-TS changes, the frequency of the system clock signal used in the MPEG decoding also changes. In other words, as the transmission speed of the MPEG-TS decreases, the frequency of the system clock signal used in MPEG decoding decreases, and on the other hand, as the transmission speed of the MPEG-TS increases, the frequency of the system clock signal used in MPEG decoding increases. The transmission speed of the MPEG-TS data may vary according to broadcasting stations, programs, and camera properties.

In the digital broadcast receiver, a graphics processor manages video output, and uses a pixel clock signal as a reference clock. The pixel clock signal is linked to the system clock signal used in MPEG decoding. Thus, as the transmission speed of the MPEG-TS changes, the frequencies of the system clock signal used in MPEG decoding and the pixel clock signal also change. If the frequency of the pixel clock changes, changes also occur in the frequencies of a horizontal synchronization signal and a vertical synchronization signal that are used to output a video from the graphics processor.

The graphics processor reads video data stored in a memory by using the horizontal synchronization signal and the vertical synchronization signal, which are generated using the pixel clock signal, and outputs the video data to a display device. Thus, if the frequencies of the horizontal synchronization signal and the vertical synchronization signal change, the frequencies of a horizontal synchronization signal and a vertical synchronization signal of the video data output to the display device from the graphics processor are also subject to change.

However, in general, a flat panel display device is designed to operate with a horizontal synchronization signal of a fixed frequency. Therefore, as described above, if the video data in which the frequency of the horizontal synchronization signal changes is provided to the display device, problems such as horizontal waves, backlight out, or color flickering are caused in an output display screen. As a result, a stable image cannot be displayed.

SUMMARY OF THE INVENTION

The present invention provides a display synchronization signal generation apparatus and method which enables display of a stable image irrespective of changes in transmission speed of a received digital broadcast signal in a digital broadcast receiver, and a decoder suitable for the display synchronization signal generation apparatus.

The present invention also provides a display synchronization signal generation apparatus and method which enables display of a stable image by generating a synchronization signal of an image to be displayed independently of a decoding period in a digital broadcast receiver, and a decoder suitable for the display synchronization signal generation apparatus.

The present invention also provides a display synchronization signal generation apparatus and method which enables display of a stable image irrespective of changes in a transmission speed of a received digital broadcast signal by generating a vertical synchronization signal of an image to be displayed based on a frequency of a horizontal synchronization signal of the image, and a decoder suitable for the display synchronization signal generation apparatus.

According to an exemplary aspect of the present invention, there is provided a display synchronization signal generation apparatus comprising a pixel clock signal generation unit and a synchronization signal generation unit. The pixel clock signal generation unit generates a pixel clock signal based on a basic clock signal. The synchronization signal generation unit generates a horizontal synchronization signal and a vertical synchronization signal of an image to be displayed based on the pixel clock signal.

According to another exemplary aspect of the present invention, there is provided a decoder that decodes a broadcast signal received in a digital broadcast receiver. The decoder includes a clock signal generation unit, a pixel clock signal generation unit, and a synchronization signal generation unit. The clock signal generation unit generates a plurality of clock signals used for the decoding of the decoder based on a reference clock signal whose speed is controlled according to a transmission speed of the received broadcast signal. The pixel clock signal generation unit generates a display pixel clock signal based on a basic clock signal that is not dependent on the reference clock signal. The synchronization signal generation unit generates a horizontal synchronization signal and a vertical synchronization signal of an image to be displayed, in synchronization with the pixel clock signal generated by the pixel clock signal generation unit.

BRIEF DESCRIPTION OF THE DRAWINGS

The above and other aspects and advantages of the present invention will become more apparent by describing in detail, exemplary embodiments thereof with reference to the attached drawings, in which.

DETAILED DESCRIPTION OF THE INVENTION

Figure 1:
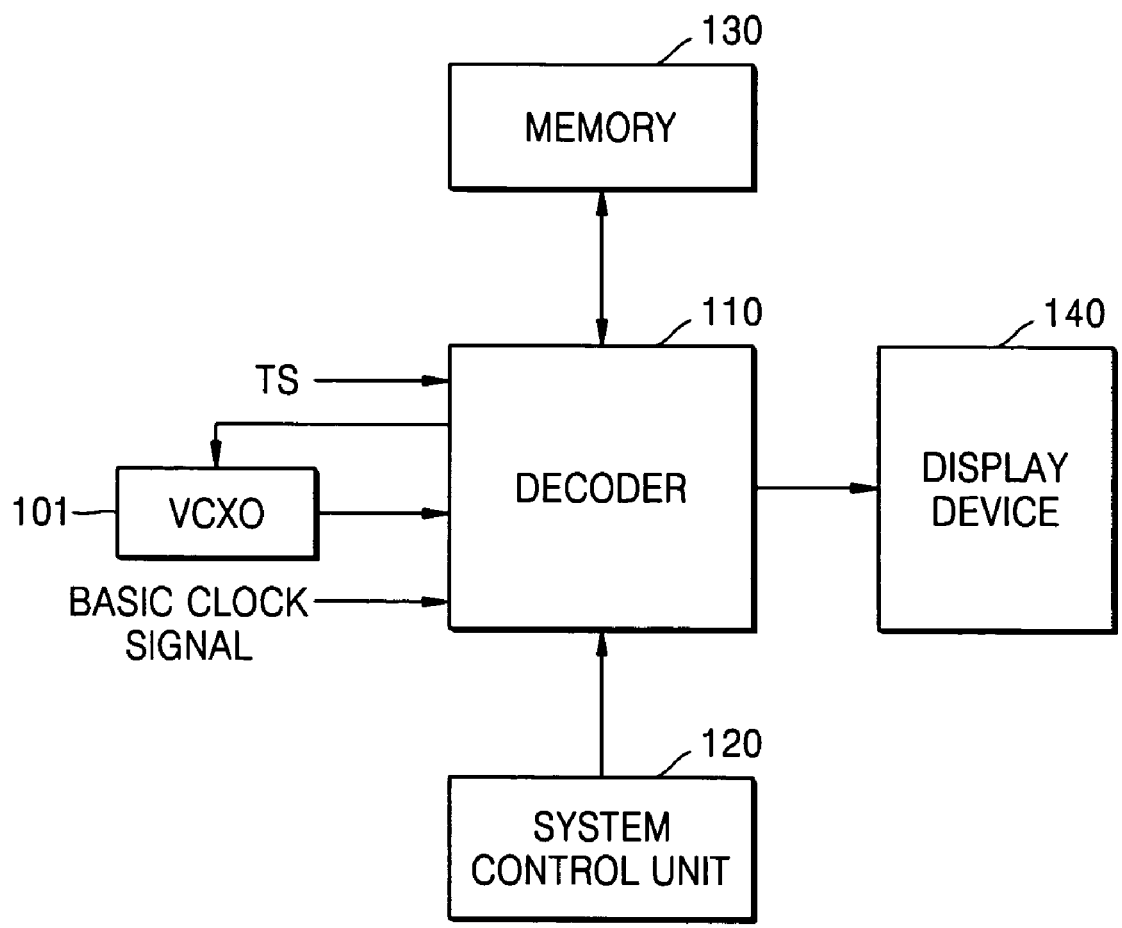
FIG. 1 is a functional block diagram of a digital broadcasting receiver having a decoder including a display synchronization signal generation apparatus according to an embodiment of the present invention.

The present invention will now be described more fully with reference to the accompanying drawings, in which embodiments of the invention is shown. Throughout the drawings, like reference numerals are used to refer to like elements.

FIG. 1 is a functional block diagram of a digital broadcasting receiver having a decoder including a display synchronization signal generation apparatus (not shown) according to the present invention.

Referring to FIG. 1, the digital broadcasting receiver includes a voltage controlled crystal oscillator (VCXO) 101, a decoder 110, a system control unit 120, a memory 130, and a display device 140.

The VCXO 101 generates a reference clock signal for decoding a received broadcast signal. The reference clock signal generally has a frequency of about 27 MHz. However, the speed of the reference clock signal generated by the VCXO 101 can be changed by a clock speed control signal provided by the decoder 110. The reference clock signal generated by the VCXO 101 is provided to the decoder 110.

Once a broadcast signal received in a transport stream (TS) format is input, the decoder 110 generates a plurality of clock signals used for decoding based on the reference clock signal provided from the VCXO 101 while providing the clock speed control signal to the VCXO 101 for the reference clock signal generated by the VCXO 101.

Also, the decoder 110 generates a display pixel clock signal having a fixed frequency, based on a preset basic clock signal and generates a horizontal synchronization signal and a vertical synchronization signal of an image to be displayed, using the generated display pixel clock signal. To this end, the decoder 110 is configured as shown in FIG. 2.

Figure 2:
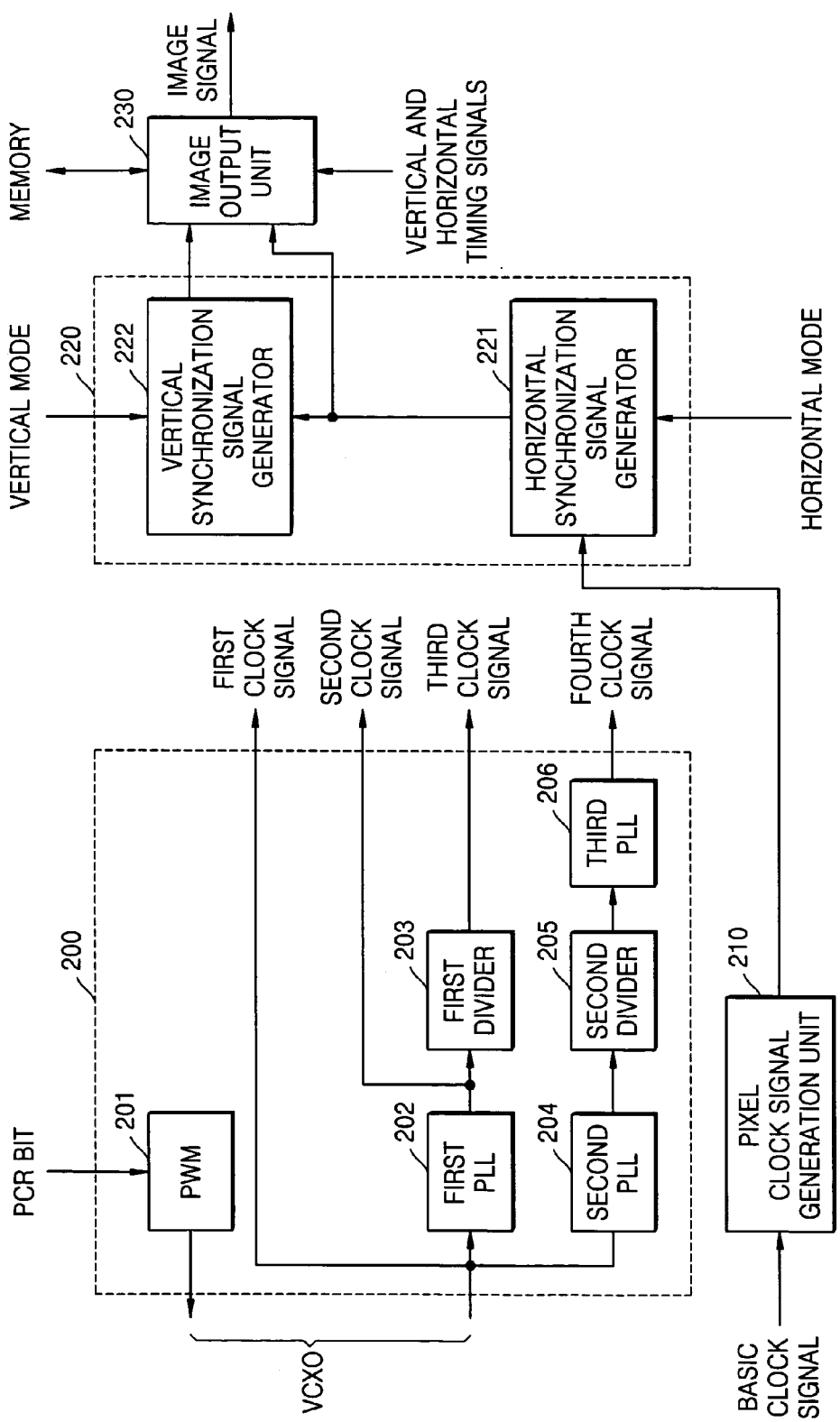
FIG. 2 is a functional block diagram of an embodiment of the display synchronization signal generation apparatus and a clock signal generation unit that are included in the decoder of FIG. 1.

Referring to FIG. 2, the decoder 110 includes a clock signal generation unit 200, a pixel clock signal generation unit 210, a synchronization signal generation unit 220, and an image output unit 230.

The clock signal generation unit 200 generates a plurality of clock signals used for decoding based on the reference clock signal whose speed is controlled according to the transmission speed of the received broadcast signal. To this end, the clock signal generation unit 200 includes a pulse width modulator (PWM) 201, a first phase locked loop (PLL) 202, a first divider 203, a second PLL 204, a second divider 205, and a third PLL 206.

The PWM 201 receives program clock recovery (PCR) bits included in the input TS, obtains the speed of an MPEG stream from the PCR bits, and provides the clock speed control signal to the VCXO 101. Thus, the speed of the reference clock signal output from the VCXO 101 may change with the transmission speed of the input TS.

Once the reference clock signal is provided from the VCXO 101, the clock signal generation unit 200 outputs the input reference clock signal as a first clock signal. The clock signal generation unit 200 generates a second clock signal by scaling up the input reference clock signal, using the first PLL 202. The clock signal generation unit 200 generates a third clock signal by dividing the second clock signal by a preset division coefficient, using the first PLL 202 and the first divider 203. The clock signal generation unit 200 generates a fourth clock signal by scaling down the input reference clock signal, using the second PLL 204, the second divider 205, and the third PLL 206.

The first clock signal may be provided for the operation of a TS demultiplexer (not shown) and standard definition output (SDOUT). The second clock signal may be provided for data communication with the memory 130. For example, if the first clock signal has a frequency of 27 MHz, the second clock signal may have a frequency of 135 MHz. The third clock signal may be provided for the operations of the system control unit 120, the TS demultiplexer (not shown), video decoding, and the operations of a display processor (DP), a graphic processor (GP) and a graphic accelerator (GA). For example, if the first clock signal has a frequency of 27 MHz, the third clock signal may have a frequency of 67.5 MHz. The fourth clock signal may be provided for audio interfacing. For example, if the first clock signal has a frequency of 27 MHz, the fourth clock signal may have a frequency of 24.5765 MHz.

The pixel clock signal generation unit 210 generates a display pixel clock signal based on the input basic clock signal. The basic clock signal is not dependent on the reference clock signal generated by the VCXO 101. Thus, the basic clock signal is generated independently of the reference clock signal generated by the VCXO 101. The display pixel clock signal has a frequency that satisfies the operating conditions of a display device 140.

Figure 3:
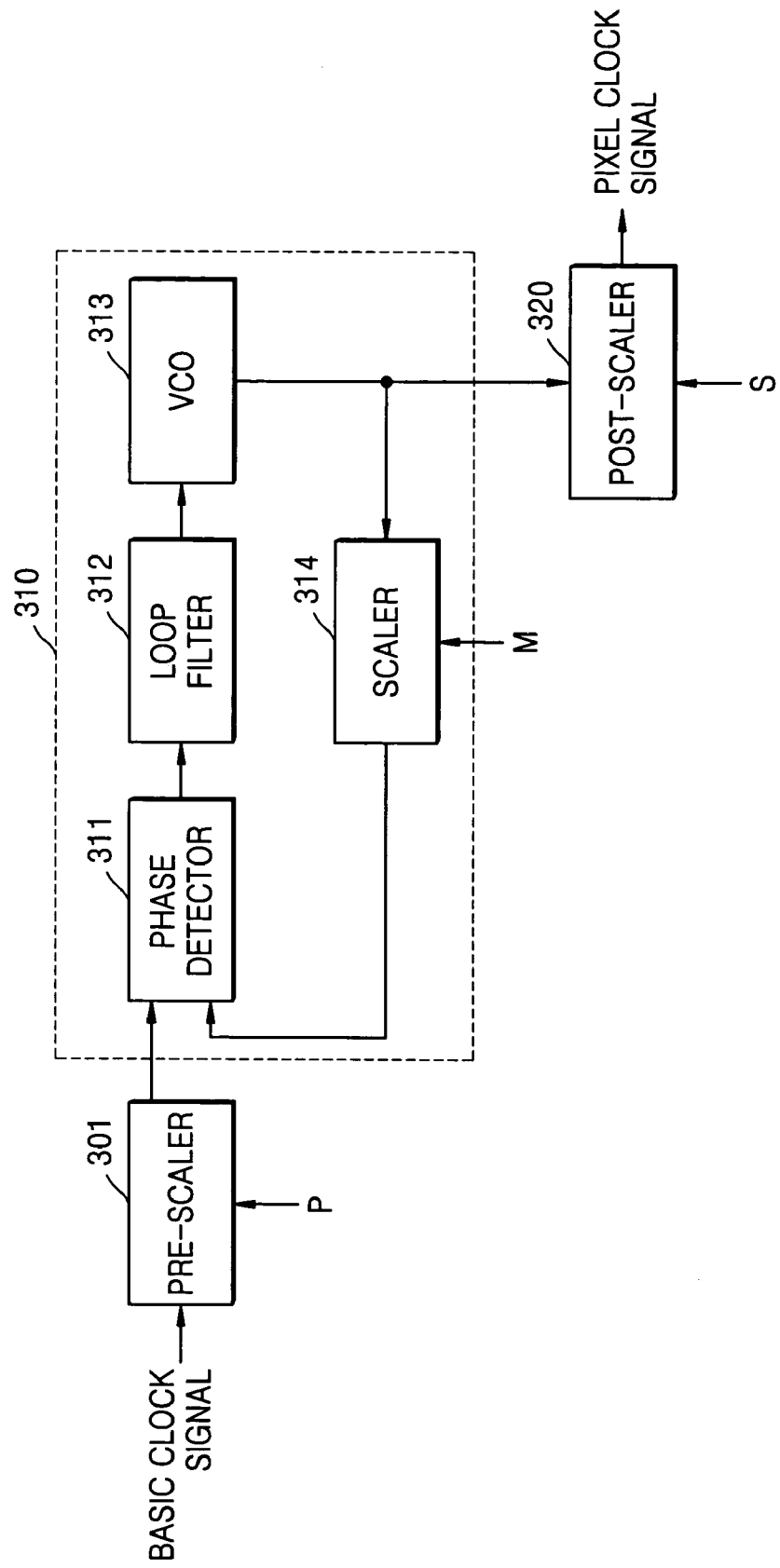
FIG. 3 is a detailed block diagram of an embodiment of a pixel clock signal generation unit of FIG. 2.

The pixel clock signal generation unit 210 performs multiple scaling to generate a display pixel clock signal of a desired frequency. As shown in FIG. 3, the pixel clock signal generation unit 210 includes a pre-scaler 301, a phase locked loop 310, and a post-scaler 320.

The pre-scaler 301 scales the input basic clock signal using a first scaling coefficient P. The pre-scaler 301 may be implemented as a divider.

The phase locked loop 310 maintains phase-locking between an output frequency scaled using a second scaling coefficient M and the scaled basic clock signal output from the pre-scaler 301.

The phase locked loop 310 includes a phase detector 311, a loop filter 312, a voltage controlled oscillator (VCO) 313, and a scaler 314. The phase detector 311 detects a phase difference between the scaled basic clock signal output from the pre-scaler 301 and the output frequency scaled using the second scaling coefficient M by the scaler 314. The loop filter 312 outputs a control voltage in which frequency components of the input phase difference are limited. The VCO 313 oscillates at a frequency corresponding to the control voltage output from the loop filter 312. A signal output from the VCO 313 is phase-locked to a signal output from the pre-scaler 301. The frequency oscillated by the VCO 313 is provided to the scaler 314. The scaler 314 scales the input frequency using the second scaling coefficient M and then outputs the result of the scaling.

The post-scaler 320 scales the frequency output from the VCO 313 of the phase locked loop 310 using a third scaling coefficient S and outputs the result of the scaling as a pixel clock signal.

The basic clock signal, the first scaling coefficient P, the second scaling coefficient M, and the third scaling coefficient S may be set to be programmable. Also, to accurately generate a pixel clock signal having a frequency that satisfies the operating conditions of the display device 140, the basic clock signal, the first scaling coefficient P, the second scaling coefficient M, and the third scaling coefficient S may be set based on the operating conditions of the display device 140.

Referring back to FIG. 2, the synchronization signal generation unit 220 generates a horizontal synchronization signal and a vertical synchronization signal of an image to be displayed, in synchronization with the pixel clock signal generated by the pixel clock signal generation unit 210. To this end, the synchronization signal generation unit 220 includes a horizontal synchronization signal generator 221 and a vertical synchronization signal generator 222.

Based on a preset horizontal mode, the horizontal synchronization signal generation unit 221 generates a horizontal synchronization signal that varies according to an input display pixel clock signal. The horizontal synchronization signal is generated as a horizontal synchronization signal H_sync of an image to be displayed. The horizontal mode may be set using H-total pixels. The H-total pixels denote the total number of pixels per frame and include all pixels assigned to H addressable, H right border, H front porch, H synchronization, H back porch, and H left border. Also, the horizontal mode is set to be programmable according to operating conditions of the display device 140.

If the horizontal mode is set using H-total pixels, the horizontal synchronization signal generator 221 obtains a horizontal frequency as follows:

$$\text{Horizontal frequency }(H\text{-freq}) = (\text{frequency of display pixel clock signal})/(H\text{-total pixels}) \quad (1)$$

The horizontal synchronization signal generator 221 generates a horizontal synchronization signal based on the horizontal frequency obtained using equation (1).

The vertical synchronization signal generator 222 generates a vertical synchronization signal of an image to be displayed, using the horizontal frequency of the horizontal synchronization signal output by the horizontal synchronization signal generator 221, in a preset vertical mode.

The vertical mode is set to be programmable according to operating conditions of the display device 140. The vertical mode may be set using V-total lines, which denote the total number of lines per frame and include all lines assigned to V addressable, V bottom border, V FP (odd field), V sync, V BP (odd field), and V top border.

If the vertical mode is set using V-total lines, the vertical synchronization signal generator 222 obtains a vertical frequency as follows:

$$\text{Vertical frequency }(V\text{-freq}) = \text{horizontal frequency }(H\text{-freq})/(V\text{-total lines}) \quad (2)$$

The vertical synchronization signal generator 222 generates a vertical synchronization signal based on a vertical frequency obtained using equation (2).

The image output unit 230 reads an image stored in the memory 130 and outputs the image to the display device 140 using the vertical synchronization signal output from the vertical synchronization signal generator 222, the horizontal synchronization signal output from the horizontal synchronization signal generator 221, and horizontal and vertical timing signals provided from the system control unit 120 such as V_back porch, V_sync width, V_front porch, H_back porch, H_sync width, and H_front porch.

The memory 130 stores image data decoded by the decoder 110 and outputs the stored image data to the image output unit 230 in response to a request of the image output unit 230.

The display device 140, such as a cathode ray tube (CRT), a liquid crystal display (LCD) or a plasma display panel (PDP), displays digital RGB signals output from the decoder 110.

In another embodiment of the present invention, the decoder 110 may be an MPEG decoding integrated chip (IC).

As described above, a pixel clock signal is generated independently of a frequency of a clock signal used for decoding a received digital broadcast signal, and horizontal and vertical synchronization signals of an image to be displayed are generated using the pixel clock signal. Thus, it is possible to prevent problems of a display screen such as horizontal waves, backlight out, or color flickering, and output a stable image irrespective of changes in the transmission speed of the digital broadcast signal.

When the display synchronization signal generation apparatus according to the present invention is built in the MPEG decoding IC included in the digital broadcast receiver, an image of an optimal quality can be provided to users when digital broadcasting is received.

While the present invention has been particularly shown and described with reference to exemplary embodiments thereof, it is understood by those of ordinary skill in the art that various changes in form and details may be made therein without departing from the spirit and scope of the invention as defined by the following claims.

What is claimed is:

1. A display synchronization signal generation apparatus comprising:
    a pixel clock signal generation unit, which generates a pixel clock signal based on a basic clock signal which is independent of a reference clock signal; and
    a synchronization signal generation unit, which generates a horizontal synchronization signal and a vertical synchronization signal of an image to be displayed, based on the pixel clock signal.

2. The display synchronization signal generation apparatus of claim 1, wherein the pixel clock signal has a frequency that satisfies an operating condition of a device on which the image is to be displayed.

3. The display synchronization signal generation apparatus of claim 1, wherein the pixel clock signal generation unit is configured to perform multiple scaling.

4. The display synchronization signal generation apparatus of claim 1, wherein the synchronization signal generation unit comprises:
    a horizontal synchronization signal generator, which generates the horizontal synchronization signal of the image to be displayed based on the pixel clock signal and a preset horizontal mode; and
    a vertical synchronization signal generator, which generates the vertical synchronization signal of the image to be displayed based on a frequency of the horizontal synchronization signal generated in the horizontal synchronization signal generation unit and a preset vertical mode.

5. The display synchronization signal generation apparatus of claim 4, wherein the preset horizontal mode and the preset vertical mode are set to be programmable according to an operating condition of a device to which the image is to be displayed.

6. A decoder that decodes a broadcast signal received in a digital broadcast receiver, the decoder comprising:
   a clock signal generation unit, which generates a plurality of clock signals used for the decoding of the broadcast signal based on a reference clock signal whose speed is controlled according to a transmission speed of the received broadcast signal;
   a pixel clock signal generation unit, which generates a display pixel clock signal based on a basic clock signal that is not dependent on the reference clock signal; and
   a synchronization signal generation unit, which generates a horizontal synchronization signal and a vertical synchronization signal of an image to be displayed, in synchronization with the pixel clock signal generated by the pixel clock signal generation unit.

7. The decoder of claim 6, wherein the synchronization signal generation unit comprises:
   a horizontal synchronization signal generator, which generates the horizontal synchronization signal of the image to be displayed based on the pixel clock signal and a preset horizontal mode; and
   a vertical synchronization signal generator, which generates the vertical synchronization signal of the image to be displayed based on a frequency of the horizontal synchronization signal generated in the horizontal synchronization signal generation unit and a preset vertical mode.

8. The decoder of claim 7, further comprising an image output unit that outputs the image to be displayed using the horizontal synchronization signal and the vertical synchronization signal generated in the synchronization signal generation unit.

9. The decoder of claim 6, further comprising an image output unit that outputs the image to be displayed using the horizontal synchronization signal and the vertical synchronization signal generated in the synchronization signal generation unit.

10. The decoder of claim 6, wherein the basic clock signal is set according to an operating condition of a device on which the image is to be displayed.

11. A method of generating a display synchronization signal, comprising:
    generating a pixel clock signal based on a basic clock signal which is independent of a reference clock signal; and
    generating a horizontal synchronization signal and a vertical synchronization signal of an image to be displayed, based on the pixel clock signal.

12. The method of claim 11, wherein the pixel clock signal has a frequency that satisfies an operating condition of a device on which the image is to be displayed.

13. The method of claim 11, wherein multiple pixel clock signals are generated by performing multiple scaling on the basic clock signal.

14. The method of claim 11, wherein the horizontal synchronization signal of the image to be displayed is generated based on the pixel clock signal and a preset horizontal mode, and the vertical synchronization signal of the image to be displayed is generated based on a frequency of the horizontal synchronization signal and a preset vertical mode.

15. The method of claim 14, wherein the preset horizontal mode and the preset vertical mode are set to be programmable according to an operating condition of a device to which the image is to be displayed.

16. A method of decoding a broadcast signal received in a digital broadcast receiver, comprising:
    generating a plurality of clock signals used for the decoding of the broadcast signal based on a reference clock signal whose speed is controlled according to a transmission speed of the received broadcast signal;
    generating a display pixel clock signal based on a basic clock signal that is not dependent on the reference clock signal; and
    generating a horizontal synchronization signal and a vertical synchronization signal of an image to be displayed, in synchronization with the pixel clock signal.

17. The method of claim 16, wherein the horizontal synchronization signal of the image to be displayed is generated based on the pixel clock signal and a preset horizontal mode, and the vertical synchronization signal of the image to be displayed is generated based on a frequency of the horizontal synchronization signal and a preset vertical mode.

18. The method of claim 17, further comprising outputting the image to be displayed using the horizontal synchronization signal and the vertical synchronization signal.

19. The method of claim 16, further comprising outputting the image to be displayed using the horizontal synchronization signal and the vertical synchronization signal.

20. The method of claim 16, wherein the basic clock signal is set according to an operating condition of a device on which the image is to be displayed.

* * * * *